United States Patent
Maldener et al.

(10) Patent No.: US 6,370,760 B1
(45) Date of Patent: Apr. 16, 2002

(54) PROCESS FOR FIXING A ROTOR WINDING

(75) Inventors: Klaus Maldener, Lauf; Martin Kiefer, Oberkirch; Helmut Aesche, Ottersweier; Uwe Hammer, Markgroeningen, all of (DE)

(73) Assignee: Robert Bosch, GmbH, Stuttgart (DE)

( * ) Notice: Subject to any disclaimer, the term of this patent is extended or adjusted under 35 U.S.C. 154(b) by 0 days.

(21) Appl. No.: 09/403,723

(22) PCT Filed: Dec. 14, 1998

(86) PCT No.: PCT/DE98/03666

§ 371 Date: Dec. 14, 1999

§ 102(e) Date: Dec. 14, 1999

(87) PCT Pub. No.: WO99/44271

PCT Pub. Date: Sep. 2, 1999

(30) Foreign Application Priority Data

Feb. 26, 1998 (DE) .......................... 198 08 069

(51) Int. Cl.[7] .......................... H02K 15/10; B29C 61/02
(52) U.S. Cl. .............. 29/596; 29/597; 29/598; 29/606; 310/43; 310/235; 264/272.2; 264/230
(58) Field of Search .................. 29/596, 597, 598, 29/606, 417; 310/43, 234, 233, 235, 236; 264/272.19, 272.2, 230, 266, 342 R

(56) References Cited

U.S. PATENT DOCUMENTS

| | | | | |
|---|---|---|---|---|
| 3,129,349 A | * | 4/1964 | Ervin | 310/234 |
| 3,697,792 A | * | 10/1972 | Roue | 310/234 |
| 3,848,332 A | * | 11/1974 | Bergquist | 29/597 |
| 4,662,045 A | * | 5/1987 | Grodum | 264/230 |
| 4,852,252 A | * | 8/1989 | Ayer | 264/230 |
| 5,937,521 A | * | 8/1999 | March et al. | 29/417 |

FOREIGN PATENT DOCUMENTS

| | | | | |
|---|---|---|---|---|
| DE | 29 12 684 | * | 2/1980 | |
| FR | 2341978 | * | 9/1977 | |
| JP | 60-141149 | * | 7/1985 | 29/596 |

* cited by examiner

Primary Examiner—Peter Vo
Assistant Examiner—A. Dexter Tugbang
(74) Attorney, Agent, or Firm—Ronald E. Greigg

(57) ABSTRACT

A process for fixing a rotor winding, which is hooked to connection lugs of commutator lamellas of a commutator in the vicinity between the connection lugs and winding heads that are embodied on the end face of the rotor body. In order to simplify the process, a shrink sleeve is placed over the commutator of the completed rotor and is slid onto the winding heads until the connection lugs and the connection wires of the rotor winding that extend to the connection lugs are covered. The mechanically fixed shrink sleeve is homogeneously heated with hot air while the rotor rotates so that after cooling, the shrink sleeve shrinks onto the connection lugs and connection wires as well as onto parts of the winding heads.

6 Claims, 1 Drawing Sheet

PROCESS FOR FIXING A ROTOR WINDING

PRIOR ART

The invention is based on a process for fixing a rotor winding, which is hooked to connection lugs or hooks of commutator lamellas of a commutator and is contained in a rotor body that is non-rotatably supported on a common rotor shaft with the commutator, in the vicinity between the connection lugs or hooks and winding heads that are embodied on the end face of the rotor head.

With rotors for commutator or collector machines, the individual, insulated winding wires of the rotor or armature winding are inserted into axial grooves disposed offset from one another on the circumference of the rotor body, which is embodied as a laminated stack of sheets, wherein the end faces of the winding wires, which are wound into separate winding coils, protrude as a so-called winding heads from the two end faces of the rotor body. The separate connection wires to the winding coils are conveyed to connection lugs embodied on the separate commutator lamellas and are attached there by means of winding around the connection lugs using different winding techniques and by bending the connection lugs while simultaneously carrying out an ultrasonic welding. An exemplary embodiment for a so-called hook collector of this kind and for the embodiment of the so-called hooking technique when fixing the winding connection wires to the collector hooks is described in WO 90/04864 A1 (FIG. 11).

So that no vibrational fractures are produced in the rotor winding during operation and in particular during the usually required hard vibration testing of the rotor, the region of the rotor winding that includes the connection winding wires is fixed between the connection lugs in a different manner, e.g. by means of a molded mass or by means of tying with or without enameled wire.

ADVANTAGES OF THE INVENTION

The process according to the invention for fixing the rotor winding in the region between the connection lugs and the winding heads of the rotor winding has the advantage that on the one hand, existing manufacturing processes and techniques can be used and on the other hand, only one additional part is required which can be shrink-fitted with a low degree of stress on the rotor and the rotor winding.

Advantageous improvements and updates of the process disclosed are possible by means of the measures taken hereinafter.

BRIEF DESCRIPTION OF THE DRAWING

The process according to the invention is explained in detail in the subsequent description in conjunction with an exemplary embodiment of a rotor for a commutator machine shown in the drawing.

FIG. 2 is a perspective representation of the rotor in FIG. 1 after the shrink sleeve has been slid on.

DESCRIPTION OF THE EXEMPLARY EMBODIMENT

Figure 1:
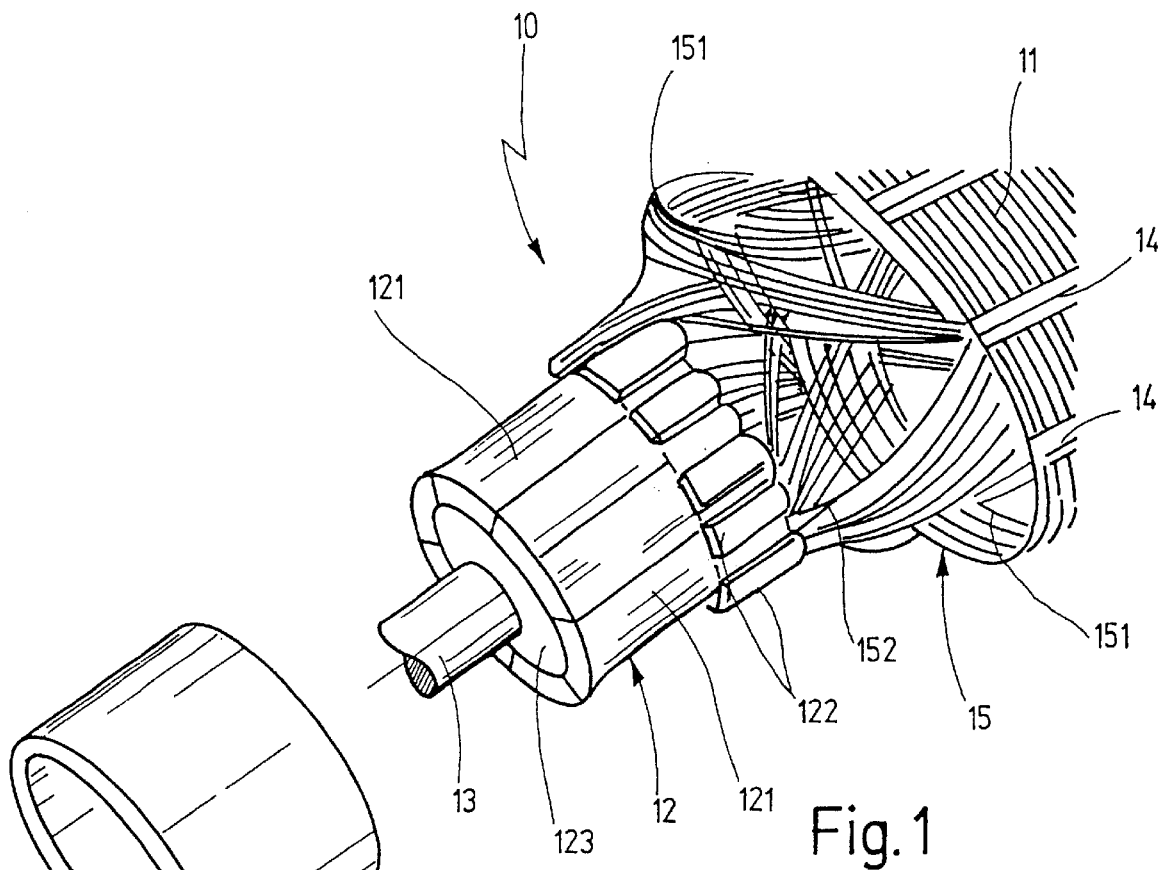
FIG. 1 is a perspective detail view of a completed rotor with a rotor shaft, rotor body, rotor winding, and commutator, as well as a shrink sleeve to be slid onto the commutator.
Figure 2:
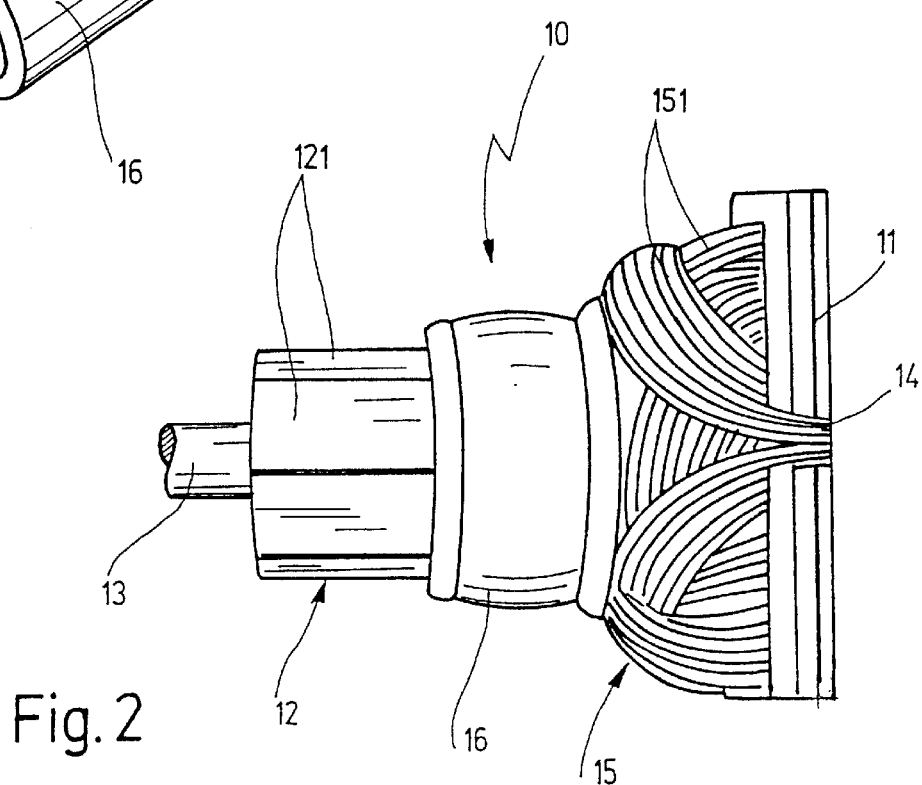

The armature or rotor 10, which is depicted in perspective fashion in FIGS. 1 and 2 and is for a commutator or collector machine, has a rotor body 11 that is embodied as a laminated stack of sheets and a collector or commutator 12, which are both non-rotatably supported on a common rotor shaft 13. The rotor body 11 has axial grooves 14 disposed distributed over the circumference, into which an armature or rotor winding 15 is wound. The separate, insulated winding wires of the rotor winding 15 are thereby inserted into the axial grooves 14 in a number of locations and constitute separate winding coils that are connected in an electrically conductive manner to the individual commutator lamellas 121 of the commutator 12. The commutator lamellas 121 are disposed in the usual fashion next to one another on the circumference of an insulation material body 123 non-rotatably supported on the rotor shaft 13, with an insulating gap between them, and extend over the entire axial length of the insulation material body.

For the electrical connection of the rotor winding 15 to the commutator 12, the individual commutator lamellas 121 are provided with connection lugs 122, also called collector hooks, which are preferably embodied as one piece. On the end face of the commutator lamellas 121 oriented toward the rotor body 11, the connection lugs 122 are angled away from this rotor body 11 and are bent over in the direction toward the commutator lamellas 121 so that the individual connection lugs 122 enclose a small, acute angle with their commutator lamellas 121. Connection wires 152 of the rotor winding 15 leading from the individual winding coils of the rotor winding 15 to the connection lugs 121 are guided around the connection wires 152 in different hooking techniques, wherein they can wind around the respective connection lugs 122 once or a number of times and can be mechanically and electrically fastened to the connection lugs 122, preferably by means of an ultrasonic welding process.

The connection wires 152 extending in the region between the winding heads 151 and the connection lugs 122 must be fixed so that no winding fractures occur in the rotor winding 15 during operation and in particular, during the usually required hard vibration testing for commutator machines used in vehicle construction. Moreover, this fixing counteracts centrifugal forces at higher speeds. In order to fix this winding region of the rotor winding 15, in the completed rotor 10 that is described above and shown in FIG. 1, a shrink sleeve 16 is placed over the commutator 12 and slid onto the winding heads 151 of the rotor winding 15 until the connection lugs 122 and the connection wires 152 extending from the connection lugs 122 to the winding heads 151 are completely covered. The shrink sleeve 16 is mechanically fixed in its position, the rotor 10 is set into rotation, and the shrink sleeve 16 is homogeneously heated with hot air. Preferably, a hot air jet produced by means of a hot air blower is used for the heating. As a result of the homogenous heating, the shrink sleeve 16 shrinks and comes to rest against the connection wires 152 in the region of the winding heads 151 and connection lugs 122. Then, the shrink sleeve 16 cools and hardens. The connection wires 152 are therefore mechanically fixed and secured against centrifugal forces.

In the exemplary embodiment of FIG. 1, the shrink sleeve 16 is produced as an individual sleeve of a predetermined length. However, the shrink sleeve 16 can also be cut to length from an endless tube with appropriate dimensions. The shrink sleeve 16 is comprised for example of VITON VS 15105-Bn.

The foregoing relates to a preferred exemplary embodiment of the invention, it being understood that other variants and embodiments thereof are possible within the spirit and scope of the invention, the latter being defined by the appended claims.

We claim:

1. A process for fixing a rotor winding (15), which is hooked to connection lugs (122) of commutator lamellas (121) of a commutator (12) and is contained in a rotor body (11) that is non-rotatably supported with the commutator (12) on a common rotor shaft (13), in a vicinity between the connection lugs (122) and winding heads (151) that are embodied on an end face of the rotor body (11), the process comprising:

placing a shrink sleeve (16) over the commutator (12) of a completed rotor (10) with the rotor body (11), commutator (12), and rotor winding (15);

sliding the shrink sleeve onto the winding heads (151) until the connection lugs (122) and connection wires (152) of the rotor winding (15) that extend to the connection lugs (122) are covered; and homogeneously heating the shrink sleeve (16) with hot air while the rotor (10) rotates to mechanically fix the shrink sleeve in place.

2. The process according to claim 1, in which the shrink sleeve (16) is cut to length from an endless tube before being slid over the winding heads.

3. The process according to claim 2, in which the shrinkage sleeve is produced as an individual sleeve of a predetermined length.

4. The process according to one of claim 3, in which a hot air blower is used to produce the hot air.

5. The process according to one of claim 2, in which a hot air blower is used to produce the hot air.

6. The process according to one of claim 1, in which a hot air blower is used to produce the hot air.

* * * * *